United States Patent
Ram et al.

(10) Patent No.: US 10,762,157 B2
(45) Date of Patent: Sep. 1, 2020

(54) BALANCING ON-SIDE ENGAGEMENT

(71) Applicant: Quantcast Corporation, San Francisco, CA (US)

(72) Inventors: Evyatar Ram, Berkeley, CA (US); Akshay Patil, Foster City, CA (US); Chandra Cherukuri, San Francisco, CA (US); Navin Viswanath, San Mateo, CA (US); Sokratis Papafloratos, Salonika (GR); Vijay Kalyanaraman, Sunnyvale, CA (US); Vikas Tawari, Santa Clara, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days.

(21) Appl. No.: 15/912,221

(22) Filed: Mar. 5, 2018

(65) Prior Publication Data
US 2019/0251207 A1    Aug. 15, 2019

(51) Int. Cl.
| | | |
|---|---|---|
| *G06F 17/20* | (2006.01) | |
| *G06F 16/954* | (2019.01) | |
| *G06Q 10/06* | (2012.01) | |
| *G06Q 30/02* | (2012.01) | |
| *H04L 29/08* | (2006.01) | |
| *G06F 16/958* | (2019.01) | |

(52) U.S. Cl.
CPC .......... *G06F 16/954* (2019.01); *G06F 16/972* (2019.01); *G06Q 10/063* (2013.01); *G06Q 30/0201* (2013.01); *H04L 67/22* (2013.01)

(58) Field of Classification Search
CPC ......... G06F 17/30873; G06F 17/30893; G06F 16/954; G06F 16/972; G06Q 10/063; G06Q 30/0201; H04L 67/22
See application file for complete search history.

(56) References Cited

U.S. PATENT DOCUMENTS

| | | | | |
|---|---|---|---|---|
| 6,327,574 B1 * | 12/2001 | Kramer | ............. | G06Q 30/0269 705/14.66 |
| 6,990,628 B1 * | 1/2006 | Palmer | ................ | G06F 17/2211 715/234 |
| 7,685,191 B1 * | 3/2010 | Zwicky | ............. | G06F 17/30867 707/706 |
| 7,814,102 B2 * | 10/2010 | Miller | ............... | G06F 17/30728 707/736 |

(Continued)

*Primary Examiner* — Shahid K Khan
(74) *Attorney, Agent, or Firm* — Robin W. Reasoner; Andrea Wheeler (57) ABSTRACT

Encouraging broader engagement with a target publisher's content by balancing on-site topic engagement. Responsive to receiving notification of a recipient's request of an item of content from the target publisher, the on-site and off-site content consumption history of the recipient is analyzed. For each of a plurality of topics, historic engagement with on-site and off-site content is measured. Deficient topics having better off-site engagement than on-site engagement are detected. Supplemental content comprising links to items of content available from the target publisher which are characterized by deficient topics is selected and sent to the recipient. In an embodiment, the supplemental content comprises a plurality of links to other web pages on the target publisher's website which are sent to the recipient browser before the requested item of content finishes loading.

20 Claims, 3 Drawing Sheets

(56) References Cited

U.S. PATENT DOCUMENTS

| | | | |
|---|---|---|---|
| 8,838,589 B1* | 9/2014 | Tam | G06F 16/337 707/732 |
| 2003/0074400 A1* | 4/2003 | Brooks | G06F 16/9535 709/203 |
| 2007/0130100 A1* | 6/2007 | Miller | G06F 16/94 |
| 2007/0234213 A1* | 10/2007 | Krikorian | H04N 21/23406 715/716 |
| 2008/0004989 A1* | 1/2008 | Yi | G06Q 30/02 705/26.1 |
| 2008/0250450 A1* | 10/2008 | Larner | G06Q 30/0256 725/34 |
| 2009/0319555 A1* | 12/2009 | Ragno | G06F 17/212 |
| 2010/0070529 A1* | 3/2010 | Gokturk | G06Q 30/02 707/780 |
| 2010/0100607 A1* | 4/2010 | Scholz | G06F 16/355 709/219 |
| 2011/0066479 A1* | 3/2011 | Benson | G06Q 20/12 705/14.4 |
| 2011/0153412 A1* | 6/2011 | Novikov | G06Q 30/02 705/14.42 |
| 2013/0159114 A1* | 6/2013 | Rodriguez | G06Q 30/00 705/14.66 |
| 2013/0173568 A1* | 7/2013 | Josifovski | G06F 17/30864 707/706 |
| 2014/0026037 A1* | 1/2014 | Garb | G06F 16/972 715/235 |
| 2014/0173660 A1* | 6/2014 | Correa | H04N 21/25866 725/42 |
| 2014/0337334 A1* | 11/2014 | Banatwala | G06Q 50/01 707/736 |
| 2014/0344217 A1* | 11/2014 | Title | G06Q 30/02 707/609 |
| 2015/0006460 A1* | 1/2015 | Skiba | G06N 5/022 706/50 |
| 2015/0213361 A1* | 7/2015 | Gamon | G06N 20/00 706/12 |
| 2015/0220492 A1* | 8/2015 | Simeonov | G06F 17/30893 715/235 |
| 2015/0226597 A1* | 8/2015 | Gaspard, Jr. | G01F 25/0007 73/1.16 |
| 2015/0339754 A1* | 11/2015 | Bloem | G06Q 30/0631 705/26.7 |
| 2016/0283460 A1* | 9/2016 | Weald | G06Q 30/0277 |
| 2016/0350669 A1* | 12/2016 | Jurka | G06F 16/24578 |
| 2017/0068992 A1* | 3/2017 | Chen | G06Q 30/0269 |
| 2017/0308532 A1* | 10/2017 | Tsang | G06F 16/24578 |
| 2017/0357650 A1* | 12/2017 | de Almeida Forjaz de Lacerda | G06F 17/3053 |
| 2017/0364948 A1* | 12/2017 | Datta | G06Q 30/0255 |
| 2018/0253496 A1* | 9/2018 | Natchu | G06F 16/951 |
| 2018/0253759 A1* | 9/2018 | Deng | G06Q 30/0254 |
| 2019/0050484 A1* | 2/2019 | Liu | G06F 16/313 |

\* cited by examiner

BALANCING ON-SIDE ENGAGEMENT

CROSS-REFERENCE TO RELATED APPLICATION

This application claims priority to Greek Patent Application No. 20180100043, entitled "Balancing On-Site Engagement" by Evyatar Ram, Akshay Patil, Chandra Cherukuri, Navin Viswanath, Sokratis Papafloratos, Vijay Kalyanaraman, and Vikas Tiwari, filed on Feb. 9, 2018, which is hereby incorporated by reference in its entirety.

BACKGROUND

Description of the Related Art

Websites seek to present visitors with engaging content because engaged visitors tend to make longer and more frequent visits which can be monetized in various ways. For example, a query about local weather may bring a visitor to a news website. In an effort to extend the visitor's engagement with the website, the visitor may be presented with supplemental content, such as a list of links to suggested on-site articles about the topic that brought the visitor to the website. In an effort to broaden the visitor's engagement with the website, supplemental content, such as links to other on-site content about a variety of different topics may also be presented. However, selecting which topics to present is a challenge.

An aggregate, retroactive analysis of on-site navigation of the website's audience of visitors may reveal that visitors interested in local weather are often also interested in local sports scores. Accordingly, in an effort to broaden engagement with the audience, a website operator may present all visitors to the local weather web page with supplemental content related to local sports. For a more customized experience, a website operator could show repeat visitors content related to their previously viewed on-site content. However, this solution limits supplemental content to the subjects related to previously viewed on-site cntent. Furthermore, this strategy could lead to over-exposure related to a narrow set of interests previously expressed by the visitor and inhibit the discovery of content related to new topics presented on the website which may be of interest to the visitor.

What is needed is a way for a web site operator to broaden engagement with a website visitor through the presentation of relevant supplemental content, tailored to the website visitor's specific interests, without risking over-exposure.

SUMMARY

Embodiments of the invention include a method, a non-transitory computer-readable storage medium and a system for providing supplemental content representing an adaptive, customized, and balanced set of topics to a recipient. In an embodiment, a recipient's engagement with content of a target publisher, such as a target web site, ("on-site engagement") is compared with the recipient's off-site media engagement, for each of a plurality of topics. The recipient's media consumption history is analyzed to select deficient topics. A deficient topic has an "engagement gap" meaning that historically, the recipient's off-site engagement with a deficient topic is better than the recipient's on-site engagement with the same deficient topic. For example, the novel recommendation system can select deficient topics which are of interest to the recipient, but are under-represented in the recipient's on-site media consumption history relative to the recipient's off-site media consumption history. Responsive to a request for content, such as a request for a web page, the recommendation system can present a recipient with supplemental content in conjunction with the requested content. The supplemental content can represent a plurality of deficient topics which are selected for the recipient responsive to the request for content and different from the topic of the requested content, encouraging continued and broad engagement with the target website. In an embodiment, the recommendation system presents a volume of supplemental content representing a deficient topic in proportion to the deficient topic's engagement gap according to the recipient's on-site and off-site media consumption histories, enabling publishers to curate the presentation of supplemental content to drive on-site recipient topic engagement to more closely match off-site recipient behaviors, adapting to changes in on-site and/or off-site browsing behaviors.

In an embodiment, the recommendation system receives a notification of a content request (e.g. a request for a web page) sent from a recipient, such as a browser, to a target publisher, such as a website operator. Websites and/or web pages may be characterized by one or more topics. A recipient's engagement with a topic may be measured according to one or more criteria, such as a "topic frequency" (a frequency of visitation to websites characterized by that topic). Responsive to receiving the notification, the recommendation engine determines an on-site topic engagement and an off-site topic engagement from the recipient's media consumption history. For engagement measured according to topic frequency, deficient topics having an off-site frequency greater than their corresponding on-site frequency in the recipient's history, are detected. Supplemental content representing the deficient topics is selected and sent to the recipient. In an embodiment, topics which are badly under-represented in the recipient's on-site media consumption history will appear in the recommended supplemental content with a frequency that is higher than topics which are only moderately under-represented. In an embodiment, the recommended supplemental content will only include topics which are under-represented by at least a threshold amount (e.g. the difference between the off-site topic frequency and the on-site topic frequency must be at least equal to a threshold value). Ideally, the supplemental content is delivered to the recipient before all of the content requested in the content request has loaded.

Advantageously, embodiments of this novel recommendation system can expose each recipient to a broad supply of relevant content without over-saturating the recipient with supplemental content of the same topic. Furthermore, the supplemental content selected and sent by the system adapts to on-site and off-site browsing behaviors.

In an embodiment, the topics are automatically extracted for each item of on-site and/or off-site content using natural language processing (NLP) techniques.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. (FIG.) 1 is a high-level block diagram of a computing environment for for balancing supplemental content, in accordance with an embodiment of the invention.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention select and send supplemental content representing a customized, balanced set of topics to a recipient such as a website visitor. A target publisher may seek to broaden a recipient's engagement with their content venue, such as a website, without overexposing the recipient to content related to a narrow set of interests. By presenting supplemental content representing deficient topics, the target publisher can engage the recipient with on-site content of interest. By detecting deficient topics, embodiments of the invention help a publisher ask the question: "In what ways does a specific recipient interact with content across the Internet that is different from the way that recipient interacts with my content?" With a proportional selection scheme, the frequency of each deficient topic among the selected items of supplemental content can be proportional to the deficient topic's degree of under-representation, enabling the target publisher to focus effort on engaging the recipient without over-saturating the recipient in a particular topic, such as the topic that brought the recipient to the target publisher's website or topics of on-site web pages previously viewed by the recipeint. Embodiments of the invention can adapt to changing on-site and off-site behaviors; so, as the recipient engages in a broader variety of topics on a target website or expresses a new interest in their off-site media consumption, the set of deficient topics will change, and the supplemental content recommended by the recommendation system will change accordingly. In an embodiment, a recipient can be an Internet browser; advantageously, the invention can adapt to present relevant material, which is particularly useful when an Internet browser is shared by people having different interests and topic engagement patterns.

Embodiments of the invention are described below in the context of Internet website browsing. It is noted that similar techniques as those described below can be used in the context of other kinds of content and content delivery systems (e.g. networked video delivery systems, networked television environments) as well. Such techniques are particularly useful where accurate, timely results on large volumes of frequently updated measurement data are desirable to support rapid decision-making in automated environments.

Figure 1:
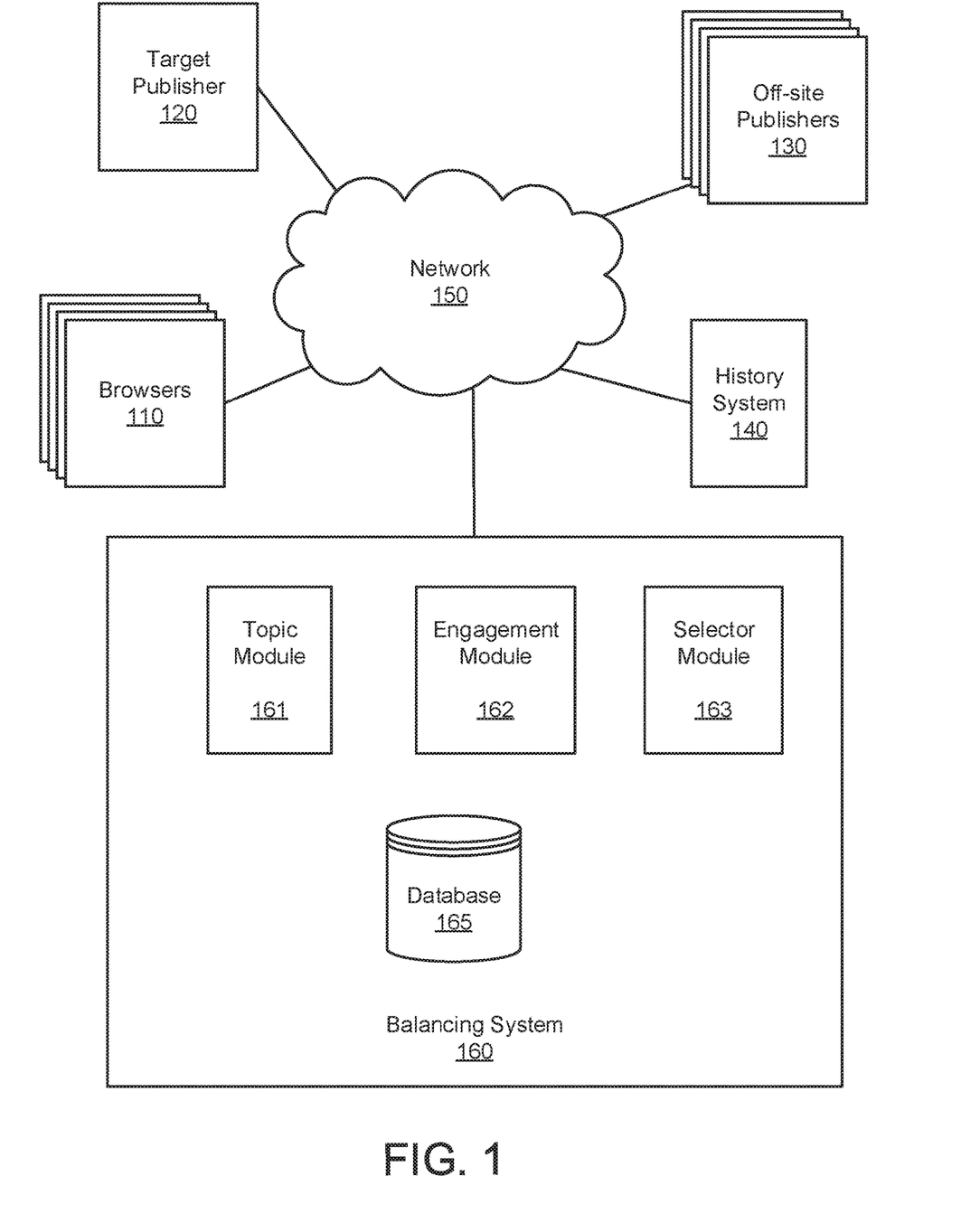

FIG. 1 is a high-level block diagram of a computing environment for balancing supplemental content, in accordance with an embodiment of the invention. The computing environment includes recipients such as browsers 110, a target publisher 120, off-site publishers 130, a history system 140, and a balancing system 160. These elements are connected by a communications network 150, such as a local area network, a wide area network, a wireless network, an intranet, a cable network, a satellite network, a cellular phone network, an optical network, the Internet, or combinations thereof.

Recipients can be users' browsers 110 such as web browsers executing on user devices (e.g. personal computers, laptop computers, tablet computers, smartphones, etc.), as the users of those devices browse the web. As users undertake their normal web browsing activities using the browsers 110, in one embodiment, data for some media consumption events is reported to the history system 140. A media consumption event is the act of accessing content over a network, such as, but not limited to, accessing a web page from a web server.

A variety of methods exist for associating a label with a web browser. For example, a software label such as a cookie value can be locally stored at a web browser. In other embodiments, labels can be composed and/or stored remotely from a device associated with the user. In some cases, a browser can have multiple labels, such as multiple first party cookies and multiple third party cookies, which can be set or exchanged with various systems. A history system 140, such as a direct measurement system, can collect and/or receive information for a browser or a system in conjunction with the label(s). In an example, when a browser requests content from a content provider, such as a target publisher 120 or an off-site publisher 130, the content provider can direct the browser to submit a pixel request to the history server 130. The pixel request can include information, such as a label, and through this request and optional subsequent actions and/or interactions, the history system 140 can collect and/or receive information from the browser in conjunction with a label, such as a cookie value, in order to enable the maintenance of a coherent body of information, such as a consumption history (i.e. history of consumption of media), a portion of a consumption history, a consumption history score, a consumption history characterization and/or a consumption history digest, over time.

In the example illustrated in FIG. 1, the history server 140 receives data from the browsers 110. The received data enables the history system 140 to record media consumption events in a data store (not shown) in conjunction with one or more labels, such as cookie values. In FIG. 1, history system 140 is shown as external to balancing system 160, but in other implementations, balancing system 160 may comprise history system 140. Also, only one instance of a history system 140 is shown in FIG. 1 for clarity, but in practice, a plurality of history systems 140 and/or data stores may operate in conjunction with the balancing system 160.

Publishers provide content to recipients such as browsers 110. Web pages, online videos, audio content, and multimedia presentations are all examples of content that may be provided by a publisher to a recipient over a network 150. In an embodiment, publishers provide content to a recipient responsive to receiving a request for the content from a recipient. In FIG. 1, both target publisher 120 and off-site publishers 130 are examples of publishers. In an embodiment, target publisher 120 may be a website, comprising a plurality of web pages, which operates in a domain (e.g. targetpublisher.com) and is controlled by a business entity. Off-site publishers 130 may be other websites, each comprising a plurality of web pages, which operate in domains which are distinct from the target publisher's domain; for example, in an embodiment, the domains of the off-site publishers are not sub-domains of the target publisher's domain and the target publisher's domain is not a sub-domain of any of the off-site publishers. The off-site publishers can be controlled by business entities other than the business entity which controls the target publisher's domain.

In an embodiment, illustrated in FIG. 1, balancing system 160 comprises a topic module 161, an engagement module 162, a selector module 163, and a database 165. Topic module 161 receives an item of content, such as a web page, or a description of an item of content's location, such as a web page URL (Uniform Resource Locator), and provides a set of one or more topics associated with the item of content. In an example, topic module 161 may analyze an item of content, such as a web page, using natural language processing (NLP) to determine one or more topics of the web page. For example, for an item of content comprising textual information, the frequency of related words in the textual information may be used to determine which topics best characterize that item of content. In some cases, an item of content may comprise meta-information, such as tags, which convey some or all of the topics of the item of content. In some cases, topic module 161 may analyze an item of content, and then assign topics to the item of content which are chosen from a limited set of topics. For example, the limited set of topics may be chosen from a flat list of topics, a hierarchical taxonomy of topics, or both. In some cases, the limited set of topics may be manually generated, automatically generated, limited to the set pf topics represented by the web pages of the target website, or combinations thereof. In some cases, topic module 161 can analyze an item of supplemental content and characterize the item of supplemental content with one or more topics.

In an embodiment, the topic module 161 may characterize an item of content by determining one or more topics for an item of content. In some cases, the topic module may also determine one or more corresponding topic strengths for some or all of the item of content's topics. A topic's strength reflects how well the topic represents the meaning of the item of content. For example, a topic's strength may reflect how frequently words, sounds, and/or images associated with the topic occur within an item of content or how frequently they occur compared to the frequency with which words, sounds, and/or images associated with other topics occur within the item of content. Similarly, a topic's strength may reflect the size and/or position of words, sounds and/or images within the item of content. For example, a word related to a topic (e.g. a synonym of a topic), which appears in large, bold font in the title of an article appearing near the top of a web page may make a large contribution to increasing a topic's strength for that web page whereas a word which appears in small font or a small image appearing near the bottom of a web page may contribute very little to a topic's strength.

In some cases, a topic's strength may characterize a measure of confidence that the characterization is accurate. For example, topic module 161 may analyze an item of content, such as a web page, using natural language processing (NLP) to determine one or more topics of the web page, with each topic having a measure of confidence. For example, an output of a NLP classification process might be:

70% chance that the web page is about donuts, 30% chance that the web page is not about donuts. The measure of confidence (e.g. 0.7 or 70% chance that the web page is about donuts) may be used to discount the topic's strength proportional to the measure of confidence, with lower measures of confidence discounting a topic's strength more than higher measures of confidence. For example, a preliminary topic strength may be determined by the topic module 161 according to the position, size, and/or frequency of a words related to a particular topic in a web page; the preliminary topic strength may be multiplied by the measure of confidence (e.g. 0.7 in the example above) to generate the topic strength.

Engagement module 162 determines a measure of topic engagement for a browser 110 with a set of items of content. A recipient's history can document a set of items of content received from publishers. For example, history system 140 may have collected a browsing history comprising web pages visited by a browser 110; the web pages of the browsing history can include web pages sent from the target publisher 120 as well as web pages sent from off-site publishers 130. The balancing system 160 can receive a recipient's history, such as a list of web pages visited, directly from the browsers 110, via a history system 140, or combinations thereof.

In an embodiment, the topic module 161, described above, may determine topics of the web pages visited by the browser 110, including web pages of the target publisher 120 and web pages of the off-site publishers 130. In an example, the engagement module 162 may determine a browser's measure of engagement with a topic ("topic engagement") for a set of items of content according to a visitation frequency (e.g. the frequency with which the browser 110 visits web pages characterized by the topic). For example, engagement module 162 can determine a visitation frequency for web pages of the target publisher 120 visited by the browser 110 which are characterized by a particular topic; this "on-site" topic engagement reflects the browser's intensity of engagement with content from the target publisher 120 for a particular topic. In an example, the engagement module 162 may determine a browser's "on-site" topic engagement for each of a plurality of topics.

Similarly, engagement module 162 can determine a browser's measure of engagement with a topic ("topic engagement") for a set of items of content for web pages of the off-site publishers 130 visited by the browser 110; this "off-site" topic engagement reflects the browser's intensity of engagement with content from publishers other than the target publisher 120 for a particular topic. In an example, the engagement module 162 may determine a browser's "off-site" topic engagement for each of a plurality of topics. In an embodiment, for efficiency, the plurality of topics may be limited to the topics of the target publisher's web pages.

In an example, each web page visit in a browser's history may be analyzed and a measure of topic engagement may be determined for each web page visited (web page topic engagement), each web page visit (web page visit topic engagement), or combinations thereof. For example, for each topic, an off-site topic engagement may be determined by summing all of the web page measures of topic engagement for web pages visited, other than the web pages of the target publisher 120; similarly, for each topic, an on-site topic engagement may be determined by summing all of the web page measures of topic engagement for the visited web pages of the target publisher 120.

In another example, an off-site topic engagement may be determined by summing all of the web page visit measures of topic engagement for visits to web pages other than the target publisher 120; for each topic, an on-site topic engagement may be determined by summing all of the web page visit measures of topic engagement for visits to the web pages of the target publisher 120. Determining topic engagement according to web page visit can emphasize the role of frequency, as contributions to the topic engagement from a web page that it is visited frequently will accumulate over time.

In an embodiment, individual measures of web page topic engagement or web page visit topic engagement may be weighted before summing. For example, for each topic, each measure of web page topic enaagement or web page visit topic engagement may be weighted according to the topic's topic strength, which may be received from the topic module 161. In an example, a weight may be applied to reflect a duration of a website visit, a frequency of website visitation (e.g. number of times a web page was visited in a time window), or an importance of an interaction type (e.g. emphasize a window resize interaction by applying a heavy weight, de-emphasize an exposure of less than thirty seconds by applying a fractional weight or eliminating the web page measure of topic engagement from the sum). Other examples of weighting can include weighting according to duration of engagement (e.g. residence on a web page measured in elapsed time, time spent interacting with a web page by actively mousing or scrolling), number of specific actions (e.g. logons), display screen size, display window size, screen resolution, volume setting, indications of the quality of engagement or combinations thereof.

Selector module 163 can detect one or more deficient topics for browser 110. A browser 110 has a deficient topic when the browser 110 exhibits better off-site engagement with a particular topic than it exhibits on-site. Detecting deficient topics for browser 110 means detecting topics having an "off-site" engagement that is stronger than their corresponding "on-site" engagement according to the history of browser 110. The difference between on-site engagement and off-site engagement can be called an engagement gap. In some embodiments, the selector module 163 may only detect deficient topics when the engagement gap is at least as large as a threshold amount.

Selector module 163 selects supplemental content from the target pubisher 120 representing a recipient's deficient topics. For example, the target publisher 120 can be a specific website, comprising a plurality of web pages, and the supplemental content can comprise content available from the specific website, such as web pages, streaming content, or downloadable content. In some cases, the supplemental content may comprise text, pictures, videos, audio content, multi-media content or combinations thereof In some cases, supplemental content may comprise one or more links, such as URLs, or locations, such as a file path or ftp (file transfer protocol) location, which lead to additional content such as another web page or other content available from the target publisher 120.

In an embodiment, selector module 163 selects the supplemental content. In an example, the selector module 163 can select supplemental content according to one or more selection criteria. A measure of the on-site under-engagement of a deficient topic is an example of a selection criteria. The enagement gap, a measure of the gap between a browser's on-site engagement and off-site engagement for a specific topic, is an example of a measure of under-engagement. A deficient topic exhibiting strong under-engagement (e.g. which has an on-site engagement which is much less than its corresponding off-site engagement) may be selected in favor of a deficient topic with a smaller engagement gap. For example, a deficient topic which is absent from or strongly under-represented in a browser 110's on-site media consumption history compared to its corresponding off-site media consumption history may be selected in favor of a deficient topic which is not as strongly under-represented. In an embodiment, the selector module 163 selects one or more items of supplemental content according to the topic of the supplemental content (e.g. supplemental content characterized by one or more deficient topics).

In an example, a plurality of items of supplemental content representing a plurality of different topics may be selected. The selected item(s) of supplemental content may, in aggregate, have a topic frequency proportional to a measure of on-site under-engagement for each respective deficient topic represented by the selected item(s) of supplemental content. In an embodiment, the selector module 163 may rank the deficient topics according to engagement gap and/or one or more criteria. The selector module 163 may select items of supplemental content characterized by deficient topics according to the rank of the deficient topics, so that items of supplemental content characterized by high-ranking deficient topics are selected in favor of items of supplemental content characterized by lower-ranking deficient topics.

In an embodiment, a selection criterion of selector module 163 can be a measure of uniqueness of the supplemental content's topic. For example, supplemental content characterized by a deficient topic which is relatively rare (e.g. occurring with a frequency less than a threshold value on English language websites, occurring with a frequency less than a threshold value in browsing histories of Internet visitors, etc.) may be preferentially selected by the selector module 163. For example, supplemental content characterized by a rare deficient topic may be selected in favor of supplemental content which is characterized by a more common deficient topic, even if the supplemental content characterized by the more common deficient topic has a larger engagement gap than the supplemental content characterized by the rare deficient topic.

Figure 2:
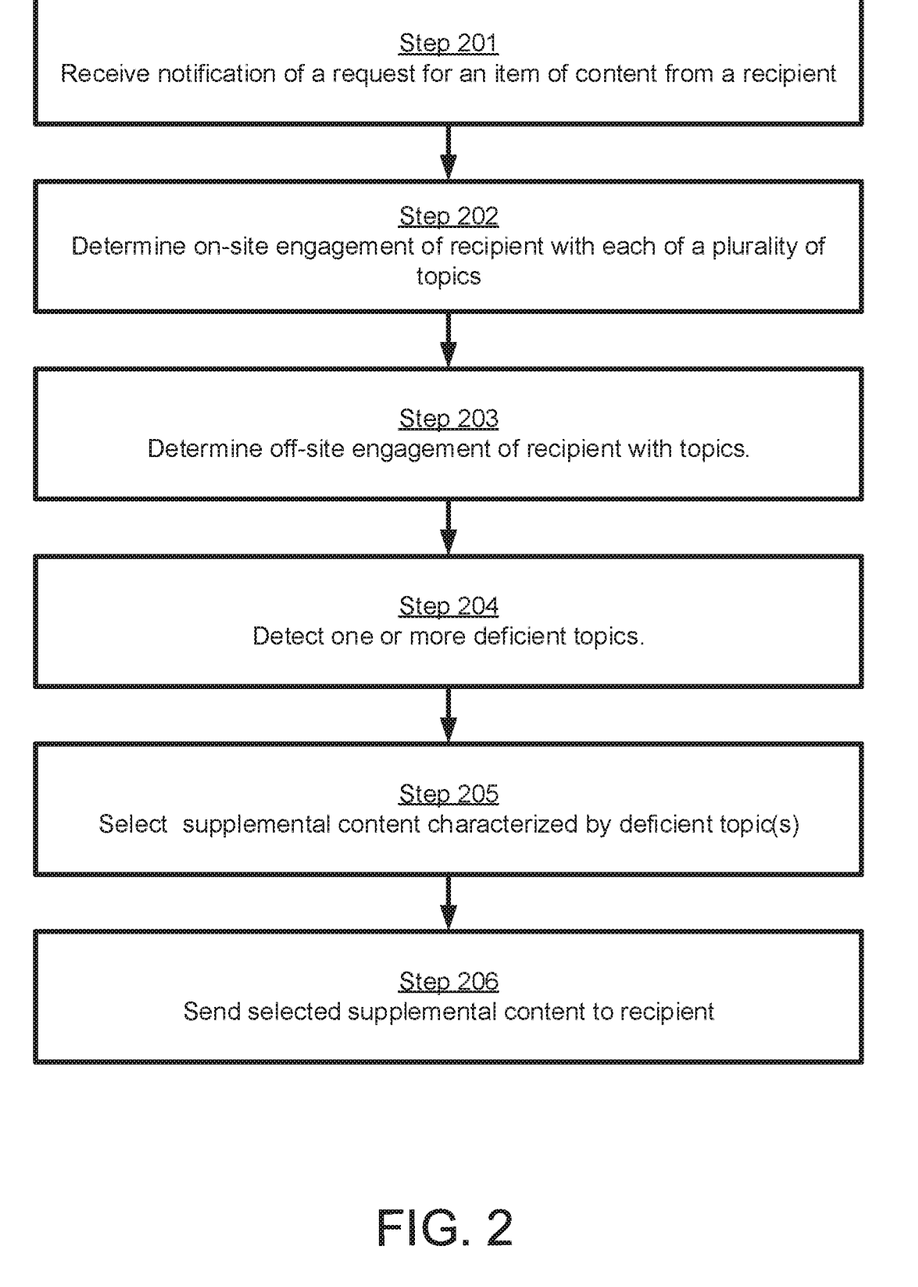
FIG. 2 is a flow chart illustrating a method of supplemental content selection, in accordance with an embodiment of the invention.

FIG. 2 is a flow chart illustrating a method of supplemental content selection, in accordance with an embodiment of the invention. In some implementations, the steps are performed in an order other than the order presented in FIG. 2, and in other implementations, additional or alternative steps may be performed.

In the scenario illustrated in FIG. 2, a recipient requests an item of content from a target publisher. For example, a user may operate browser 110 and navigate to a web page of a target publisher 120 (e.g. a target website) that includes a slot which can contain supplemental content, such as links to other web pages of the target website. The recipient requests the item of content (e.g. the web page) from the target publisher 120. In step 201, a notification of the request for an item of content is received by the balancing system 160. The notification may be received from the target publisher 120, the recipient (e.g. browser 110), or both. The notification may comprise information which allows the balancing system 100 to access a media consumption history of the recipient (e.g. a browsing history) from a database 165, a history system 140 or both, such as a label. In some cases, the notification may comprise some or all of the recipient's media consumption history.

In step 202, the on-site engagement of the recipient is determined with respect to each of a plurality of topics. In an embodiment, the recipient's history of browsing other items of content of the target publisher (e.g. other web pages of the target publisher's website) is analyzed. Each item of content may be characterized by one or more topics. In some cases, an item of content's topic has an associated strength which can be used to modulate the impact of a visit to the item of content may have on the topic's measure of engagement. A measure of the recipient's engagement with a particular topic may be determined according to one or more criteria such as, but not limited to, duration, frequency and/or type of engagement with items of content characterized by the particular topic.

In step 203, the off-site engagement of the recipient is determined with respect to some or all of the plurality of topics. In an embodiment, the recipient's history of browsing items of content over a network, excluding itemd of content of the target publisher is analyzed. For example, the recipient's history of browsing websites other than a target publisher's website may be analyzed to determine the off-site engagement of the recipient for each of a plurality of topics.

In step 204, deficient topics are detected. A deficient topic has an "engagement gap" meaning that historically, the recipient's off-site engagement with a deficient topic is better than the recipient's on-site engagement with the same deficient topic. In some cases, the measure of off-site engagement with a topic must be greater than the on-site engagement with the same topic by at least a threshold value to be deemed a deficient topic. In some cases, a topic's off-site engagement must meet a minimum engagement criteria to be a deficient topic; in this way, topics of little interest to the recipient may be excluded from the supplemental content.

In step 205, supplemental content characterized by deficient topics is selected. The supplemental content comprises content, such as links to webpages on the target publisher's website. In an example, the supplemental content comprises a plurality of links representing content available through the publisher's website representing a plurality of different topics. In some cases, the plurality of topics represented by the linked supplemental content is proportional to the engagement gaps of the respective deficient topics. For example, if a recipeint's engagement gap for a first deficient topic is twice the size of the engagement gap for the recipeint's second deficient topic, links to on-site content characterized by the first topic may be selected with a frequency that is twice the frequency of links to on-site content characterized by the second topic.

In step 206, selected supplemental content is sent to the recipient. In an embodiment, to avoid interfereing with the recipient's media consumption experience, the selected supplemental content is sent to the recipient before the requested item of content has finished being displayed to the end user. For example, supplemental content comprising links to other web pages of a target publisher's website must be rendered on the end-user's display before the requested item of content finishes loading.

In some implementations, the process illustrated in steps 201 through 206 of FIG. 2 can be executed very quickly. Ideally, the time passage between the browser 110 requesting the the item of content and the user viewing the item of content and the supplemental content is short enough not to impact the user's enjoyment of the target publisher's website that the user is browsing. To achieve this, the time passage between step 201 when the notification is received by the balancing system and step 206 when the supplemental content is sent to the recipient must be very short.

Additional Embodiments

The description above has focused primarily on the example of a recipient which is a browser 110, items of content comprising web pages, and supplemental content comprising links to web pages, with both a target publisher 120 and off-site publishers 130 comprising web publishers. It is understood that embodiments of the invention are applicable to other types of networked recipients, types of items of content available over a network, types of supplemental content available over a network, types of networked publishers, or combinations thereof. For example, other types of networked recipients may comprise networked gaming consoles, networked televisions, mobile phones, mobile devices, mobile applications, etc. Other types of items of content may comprise interactive content delivered over a network such as networked games, video content delivered over a network, mobile phone applications which receive content over a mobile network, or combinations thereof. Other types of supplemental content may comprise video content, in-game content, audio content, etc. Other types of publishers may comprise video streaming services, gaming servers, mobile application servers, etc. In some embodiments, on-site engagement, off-site engagement or both may be determined according to consumption histories of a plurality of different types of content. For example, a recipeint's topic engagement may be determined according to both a video streaming history and a browsing history.

Physical Components of a Computer

Figure 3:
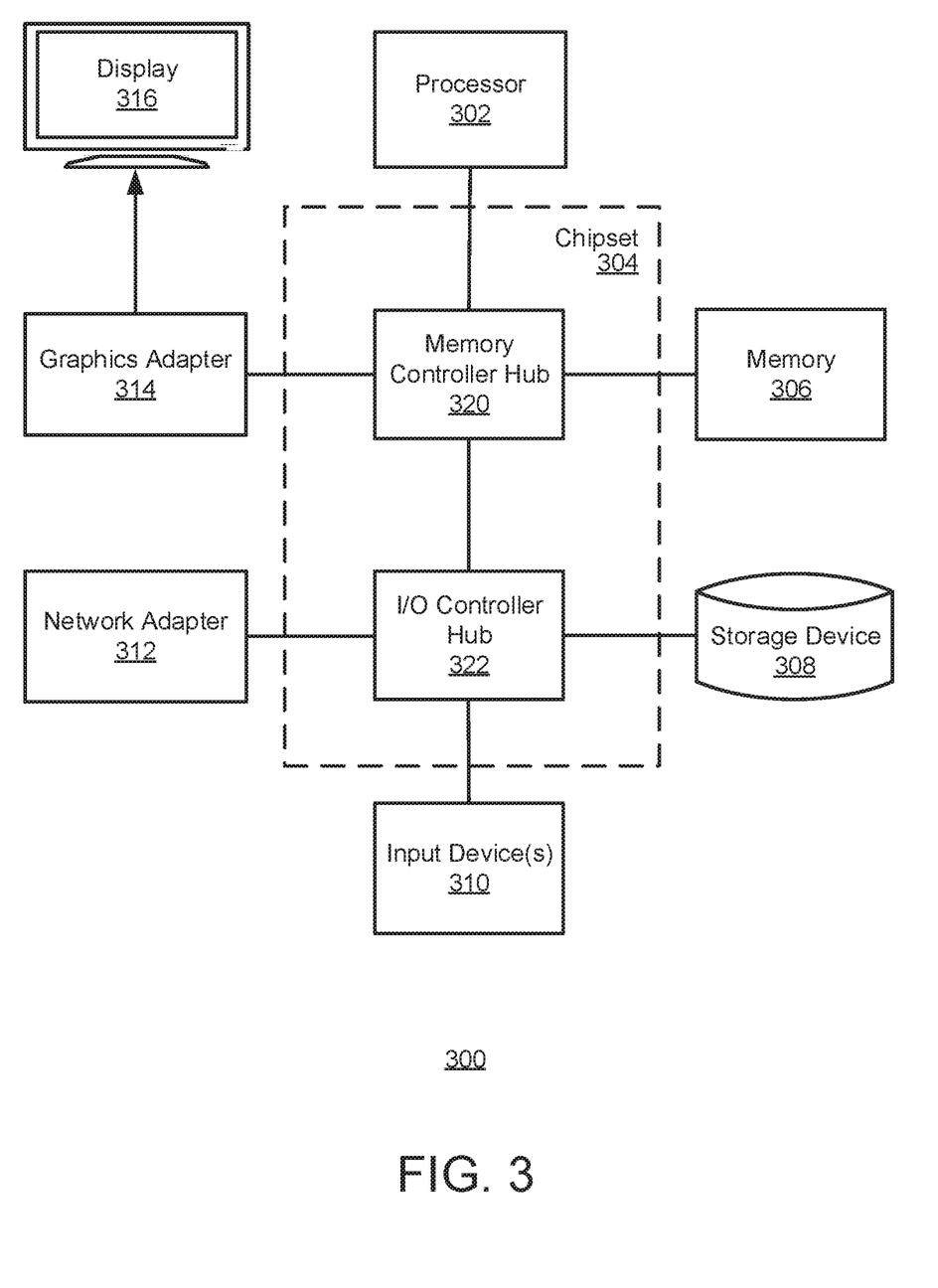
FIG. 3 is a high-level block diagram of the components of a computing system for use, for example, as a balancing system, browser, target publisher, off-site publisher, and/or history system depicted in FIG. 1, in accordance with an embodiment.

FIG. 3 is a high-level block diagram of the components of a computing system 300 for use, for example, as a balancing system 100, browser 110, target publisher 120, off-site publisher 130, and/or history system 140 depicted in FIG. 1, in accordance with an embodiment. Illustrated are at least one processor 302 coupled to a chipset 304. Also coupled to the chipset 304 are a memory 306, a storage device 308, input device(s) 310, a network adapter 312, and a graphics adapter 314. A display 316 is coupled to the graphics adapter 314. In one embodiment, the functionality of the chipset 304 is provided by a memory controller hub 320 and an I/O controller hub 322. In another embodiment, the memory 306 is coupled directly to the processor 302 instead of the chipset 304.

The processor 302 is the hardware logic circuitry of the computer 300 that processes instructions such as computer programs to operate on data. The memory 306 holds instructions and data used by the processor 302. The storage device 308 is any non-transitory computer-readable storage medium, such as a hard drive, compact disk read-only memory (CD-ROM), DVD, or a solid-state memory device. The input devices(s) 310 may be a keyboard, mouse, track ball, touch-sensitive screen and/or another type of pointing device to input data into the computer 300. The network adapter 312 couples the computer 400 to a network. The graphics adapter 314 displays images and other information on the display 316.

As is known in the art, a computer 300 can have different and/or other components than those shown in FIG. 3. In addition, the computer 300 can lack certain illustrated components. In one embodiment, a computer 300 acting as a server may lack an input device 310, a graphics adapter 314, and/or a display 316. Moreover, the storage device 308 can be local and/or remote from the computer 300 (such as embodied within a storage area network (SAN)).

As is known in the art, the computer 300 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302. The functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed is:

1. A computer-implemented method comprising:
receiving notification of a browser's request of a web page of a target website, the target website comprising a plurality of web pages, each web page having an on-site topic and each on-site topic having an on-site topic strength; and
responsive to receiving the notification, sending supplemental content comprising links of different web pages of the target website to the browser before the web page finishes loading by:
measuring the browser's on-site engagement with each of a plurality of topics according to visits by the browser to a plurality of web pages of the target website and according to the on-site topic strength of the corresponding on-site topic, wherein the plurality of web pages of the target website operate in a first domain controlled by a first business entity;
measuring the browser's off-site engagement with each of the plurality of topics according to visits by the browser to a plurality of off-site web pages, wherein the plurality of off-site web-pages operate in a second domain controlled by a second business entity, each of the plurality of off-site web pages having an off-site topic corresponding to one of the plurality of topics; and
determining an engagement gap corresponding to each of the plurality of topics by subtracting the corresponding measured on-site engagement from the corresponding measured off-site engagement;
detecting deficient topics having a positive engagement gap;
selecting one or more items of supplemental content, each item of supplemental content characterized by one or more deficient topics; and
sending the selected items of supplemental content to the browser.

2. The method of claim 1, wherein selecting the one or more items of supplemental content comprises:
ranking deficient topics according to their respective engagement gaps; and
selecting the supplemental content according to the ranked deficient topics.

3. The method of claim 1, wherein selecting the one or more items of supplemental content comprises:
selecting deficient topics having an engagement gap greater than a threshold amount.

4. The method of claim 1, further comprising:
extracting the topics from web page content, wherein topic strength indicates a correlation strength between the topic and the corresponding web page content.

5. The method of claim 1, wherein:
on-site engagement and off-site engagement each comprise a measure of visitation frequency.

6. The method of claim 1, wherein:
on-site engagement and off-site engagement each comprise a measure of visitation duration.

7. The method of claim 1, wherein:
supplemental content comprises links to content available from the target website other than the requested web page of the target website.

8. A non-transitory computer-readable storage medium storing processor-executable program instructions that, when executed, cause a computer program to perform a method, the method comprising:
receiving notification of a browser's request of a web page of a target website, the target website comprising a plurality of web pages, each web page having an on-site topic and each on-site topic having an on-site topic strength; and
responsive to receiving the notification, sending supplemental content comprising links of different web pages of the target website to the browser before the web page finishes loading by:
measuring the browser's on-site engagement with each of a plurality of topics according to visits by the browser to a plurality of web pages of the target website and according to the on-site topic strength of the corresponding on-site topic, wherein the plurality of web pages of the target website operate in a first domain controlled by a first business entity;
measuring the browser's off-site engagement with each of the plurality of topics according to visits by the browser to a plurality of off-site web pages, wherein the plurality of off-site web-pages operate in a second domain controlled by a second business entity, each of the plurality of off-site web pages having an off-site topic corresponding to one of the plurality of topics; and
determining an engagement gap corresponding to each of the plurality of topics by subtracting the corresponding measured on-site engagement from the corresponding measured off-site engagement;
detecting deficient topics having a positive engagement gap;
selecting one or more items of supplemental content, each item of supplemental content characterized by one or more deficient topics; and
sending the selected items of supplemental content to the browser.

9. The medium of claim 8 wherein selecting the one or more items of supplemental content comprises:
ranking deficient topics according to their respective engagement gaps; and
selecting the supplemental content according to the ranked deficient topics.

10. The medium of claim 8, wherein selecting the one or more items of supplemental content comprises:
selecting deficient topics having an engagement gap greater than a threshold amount.

11. The medium of claim 8, wherein:
on-site engagement and off-site engagement each comprise a measure of visitation frequency.

12. The medium of claim 8, wherein:
supplemental content comprises links to content available from the target website other than the requested web page of the target website.

13. A system comprising:
a processor;
a non-transitory computer-readable storage medium storing processor-executable computer program instructions that, when executed, cause a computer program to perform a method, the method comprising:
receiving notification of a browser's request of a web page of a target website, the target website comprising a plurality of web pages, each web page having an on-site topic and each on-site topic having an on-site topic strength; and
responsive to receiving the notification, sending supplemental content comprising links of different web pages of the target website to the browser before the web page finishes loading by:
measuring the browser's on-site engagement with each of a plurality of topics according to visits by the browser to a plurality of web pages of the target website and according to the on-site topic strength of the corresponding on-site topic, wherein the plurality of web pages of the target website operate in a first domain controlled by a first business entity;
measuring the browser's off-site engagement with each of the plurality of topics according to visits by the browser to a plurality of off-site web pages, wherein the plurality of off-site web-pages operate in a second domain controlled by a second business entity, each of the plurality of off-site web pages having an off-site topic corresponding to one of the plurality of topics; and
determining an engagement gap corresponding to each of the plurality of topics by subtracting the corresponding measured on-site engagement from the corresponding measured off-site engagement;
detecting deficient topics having a positive engagement gap;
selecting one or more items of supplemental content, each item of supplemental content characterized by one or more deficient topics; and
sending the selected items of supplemental content to the browser.

14. The system of claim 13, wherein
selecting the one or more items of supplemental content comprises:
ranking deficient topics according to their respective engagement gaps; and
selecting the supplemental content according to the ranked deficient topics.

15. The system of claim 13, wherein selecting the one or more items of supplemental content comprises:
selecting deficient topics having an engagement gap greater than a threshold amount.

16. The system of claim 13, wherein:
on-site engagement and off-site engagement each comprise a measure of visitation frequency.

17. The system of claim 13, wherein:
supplemental content comprises links to content available from the target website other than the requested web page of the target website.

18. The method of claim 1, wherein on-site topic strength and off-site topic strength each comprise a measure of appearance frequency of a topic keyword on the corresponding web page.

19. The medium of claim 8, wherein on-site topic strength and off-site topic strength each comprise a measure of appearance frequency of a topic keyword on the corresponding web page.

20. The system of claim 13, wherein on-site topic strength and off-site topic strength each comprise a measure of appearance frequency of a topic keyword on the corresponding web page.

\* \* \* \* \*